(12) United States Patent
Awamoto et al.

(10) Patent No.: US 7,305,453 B2
(45) Date of Patent: Dec. 4, 2007

(54) CONTENTS CONVERSION METHOD AND SERVER

(75) Inventors: Yasuhiko Awamoto, Minato (JP); Toshiki Nagai, Minato (JP)

(73) Assignee: Fujitsu Limited, Kawasaki (JP)

(*) Notice: Subject to any disclaimer, the term of this patent is extended or adjusted under 35 U.S.C. 154(b) by 539 days.

(21) Appl. No.: 10/067,296

(22) Filed: Feb. 7, 2002

(65) Prior Publication Data
US 2003/0023756 A1 Jan. 30, 2003

(30) Foreign Application Priority Data
Jul. 3, 2001 (JP) ............................. 2001-202404

(51) Int. Cl.
*G06F 15/16* (2006.01)
(52) U.S. Cl. ..................... 709/217; 709/219; 709/246
(58) Field of Classification Search ............... 709/203, 709/205, 208, 227, 229, 225, 226, 246, 248, 709/217, 219
See application file for complete search history.

(56) References Cited

U.S. PATENT DOCUMENTS

| | | | | |
|---|---|---|---|---|
| 5,812,768 | A * | 9/1998 | Page et al. | 709/228 |
| 5,848,415 | A * | 12/1998 | Guck | 707/10 |
| 6,185,625 | B1 * | 2/2001 | Tso et al. | 709/247 |
| 6,247,048 | B1 * | 6/2001 | Greer et al. | 709/219 |
| 6,311,215 | B1 * | 10/2001 | Bakshi et al. | 709/221 |
| 6,360,273 | B1 * | 3/2002 | Beurket et al. | 709/244 |
| 6,530,081 | B1 * | 3/2003 | Hayes, Jr. | 717/176 |
| 6,654,814 | B1 * | 11/2003 | Britton et al. | 709/246 |
| 6,675,216 | B1 * | 1/2004 | Quatrano et al. | 709/229 |
| 6,684,257 | B1 * | 1/2004 | Camut et al. | 709/246 |
| 6,704,791 | B1 * | 3/2004 | Harris | 709/231 |
| 6,769,009 | B1 * | 7/2004 | Reisman | 709/201 |
| 6,847,987 | B2 * | 1/2005 | Case et al. | 709/203 |

(Continued)

FOREIGN PATENT DOCUMENTS

GB 2 344 197 5/2000

(Continued)

OTHER PUBLICATIONS

Yutaka Sato, Interface '95, No. 9, Chapter 5: The Functional Details of the Multipurpose Proxy Server DeleGate—Access/Routing Control and Protocol Conversion, Sep. 1, 1995, pp. 130-146 (Abstract).

*Primary Examiner*—Ario Etienne
*Assistant Examiner*—Sargon N Nano
(74) *Attorney, Agent, or Firm*—Staas & Halsey LLP

(57) ABSTRACT

A technique enabling several kinds of contents information to be used in terminals like cellular phones, regardless of the type of terminals without burdening contents providers. A contents conversion server receives, from a terminal, access destination information such as a URL of a contents providing server, and type information on the terminal or on its browser. Next, if the access destination information is interpreted to point to contents information not in the contents conversion server, but in the contents providing server, as an access destination, the contents conversion server obtains the pointed to contents information from the contents providing server. Then, the contents conversion server converts an arbitrary type of obtained contents information, based on the type of information, and moreover, converts the link information, if included, in accordance with a predetermined rule. Consequently, the contents conversion server sends converted contents information to the terminal.

6 Claims, 6 Drawing Sheets

| U.S. PATENT DOCUMENTS | | | | |
|---|---|---|---|---|
| 6,925,481 B2* | 8/2005 | Singhal et al. | | 709/200 |
| 6,950,881 B1* | 9/2005 | Ndili | | 709/246 |
| 7,194,552 B1* | 3/2007 | Schneider | | 709/245 |
| 2001/0000358 A1 | 4/2001 | Isomichi et al. | | |
| 2002/0010746 A1* | 1/2002 | Jilk et al. | | 709/206 |
| 2002/0026500 A1* | 2/2002 | Kanefsky et al. | | 709/219 |
| 2002/0141442 A1* | 10/2002 | Plain et al. | | 370/466 |

| FOREIGN PATENT DOCUMENTS | | |
|---|---|---|
| JP | 08-044643 | 2/1996 |
| JP | 11-149448 | 6/1999 |
| JP | 11-195028 | 7/1999 |
| JP | 2000-003334 | 1/2000 |
| JP | 2000-305837 | 11/2000 |

* cited by examiner

```
GET /a1.co.jp/index.html     HTTP/1.0
USER-AGENT: XXXX
    . . .
```

```
GET /index.html     HTTP/1.0
    . . . .
```

```
<html>
<a href="http://a2.co.jp/inf1.html">INFORMATION 1</a>
<a href="http://a3.co.jp/inf2.html">INFORMATION 2</a>
</html>
```

```
<html>
<a href="http://ig.bsc.co.jp/a2.co.jp/inf1.html">INFORMATION 1</a>
<a href="http://ig.bsc.co.jp/a3.co.jp/inf2.html">INFORMATION 2</a>
</html>
```

```
<html>
<a href="http://ig.bsc.co.jp/a1.co.jp/inf1.html">A1 SERVICE</a>
</html>
```

```
GET /a1.co.jp/inf1.html    HTTP/1.0
USER-AGENT: XXXX
     . . .
```

CONTENTS CONVERSION METHOD AND SERVER

TECHNICAL FIELD OF THE INVENTION

This invention relates to a technique for converting contents information described in a markup language, such as HTML (Hyper Text Markup Language), in accordance with a type of user terminal and so on.

BACKGROUND OF THE INVENTION

For example, Japanese Laid Open Patent Application No. 8-44643 discloses following matters. Namely, a client terminal connected with a LAN inside a company, a router which connects the LAN inside the company with an external network, a gateway device connected with the external network (e.g. whose URL (Uniform Resource Locator) is www.out.company.co.jp), and various servers (e.g. URL of one of the servers is www.is.university.ac.jp) exist, the client terminal acquires information on the various servers from the gateway device. If a HTML file acquired from other servers includes link information, the gateway device changes the link information. For example, if "http://www.is.university.ac.jp/welcome.html" is a link destination, the gateway device changes the link information to "http://www.out.company.co.jp/http://www.is.university.ac.jp/welcome.html". Moreover, if on the LAN inside the company only HTTP (Hyper Text Transfer Protocol) can be used and link information represents the usage of FTP (File Transfer Protocol), for example, when a user selects such a link, the gateway device acquires information via FTP from another server, and converts the information into a hyper text format and sends the information in the hyper text format via HTTP to the client terminal.

In the conventional technique described above, client terminals connected with the LAN inside the company are limited, and a gateway device doesn't need to perform processes in consideration of the type of each client terminal and so on.

However, the type of device which can be connected to computer networks such as the Internet increased rapidly, so it is really difficult to prepare contents information for all the devices with the difference in the screen size or the number of digits and the type of supported markup language, or it costs very much.

On the other hand, users hope to use useful information, regardless of the type of device. Particularly on the cellular phone, available sites are limited for every communication careers, and even if very useful sites exist, users of other careers may not be able to see it on their cellular phones.

SUMMARY OF THE INVENTION

Therefore, an object of this invention is to provide a technique enabling several kinds of contents information to be used, regardless of the type of terminal without making a burden to contents providers.

A contents conversion method executed in a contents conversion server, which is the first aspect of this invention, includes the following steps of: receiving from a user terminal (e.g. a cellular phone, a personal computer and PDA (Personal Digital Assistance) and so on), access destination information and information concerning a type of the user terminal or an access requesting source (e.g. a browser) in the user terminal; if it is interpreted that the access destination information represents contents information in a server (e.g. a contents providing server in the preferred embodiment) which is different from the contents conversion server as an access destination, acquiring the contents information represented in the access destination information from the server; by judging a format of the acquired contents information and converting the contents information, based on the information concerning the type of the user terminal or the access requesting source in the user terminal, and, if the contents information includes link information, by converting the link information in accordance with a predetermined rule, generating converted contents information; and transmitting the converted contents information to the user terminal.

Consequently, the contents provider has only to prepare contents of one type, and doesn't need to prepare any contents conversion program and so on individually. In addition, as for the user, only by inputting, for example, a combination of a URL of the contents conversion server and a domain name of the contents providing server, or only by clicking a link part if such link information is already provided in the hyper text format, the user can acquire contents information which is adapted to the type of his or her own user terminal or of the access requesting source in the user terminal automatically.

In addition, for example, the aforementioned predetermined rule may be a rule to convert the original link destination into a format in which an address of the contents conversion server is set as the access destination (e.g. the domain name) and information concerning the original link destination (e.g. the URL of the link destination) is included.

In addition, the first aspect of this invention may further comprise a step of, if it is interpreted that the access destination information represents only the contents conversion server as the access destination, transmitting information which includes the link information for causing to access via the contents conversion server to other registered servers. For example, at the first access, as describe above, the user may input a combination of the domain name of the contents conversion server and the URL of the contents providing server. But, like this, the user may access to the contents conversion server directly and acquire a list of the link information (with a form the domain name of the contents conversion server is connected with the URL of the contents provider) of registered contents providing servers. The contents provider can encourage more users to use its services by registering himself or herself to the contents conversion server.

A converted contents acquiring method, which is the second aspect of this invention, includes the following steps of: to acquire contents information of an arbitrary format corresponding to a different type from a type of user terminal or the access requesting source in the user terminal, transmitting at least one part of a uniform resource locator (URL) of the contents information provider (e.g. as a pass name. The protocol name may be omitted.) and information concerning the type of the user terminal or the access requesting source in the user terminal to the contents conversion server (e.g. as a GET-request of HTTP); and receiving and displaying on a display device, contents information from the contents conversion server, wherein a conversion corresponding to the type of the user terminal or the access requesting source of the user terminal is performed for the contents information and if link information is included in the contents information, the link information in the contents information is converted in accordance with a predetermined rule.

Incidentally, the aforementioned contents conversion method may be realized by executing a dedicated program installed into computer hardware. In this case, this program is stored in a storage medium or a storage device such as a flexible disk, a CD-ROM, a magneto-optical disk, a semiconductor memory, a hard disk. And, it may be distributed through a network and so on. Incidentally, an intermediate processing result is stored in a memory temporarily.

DETAIL DESCRIPTION OF THE PREFERRED EMBODIMENTS

Figure 1:
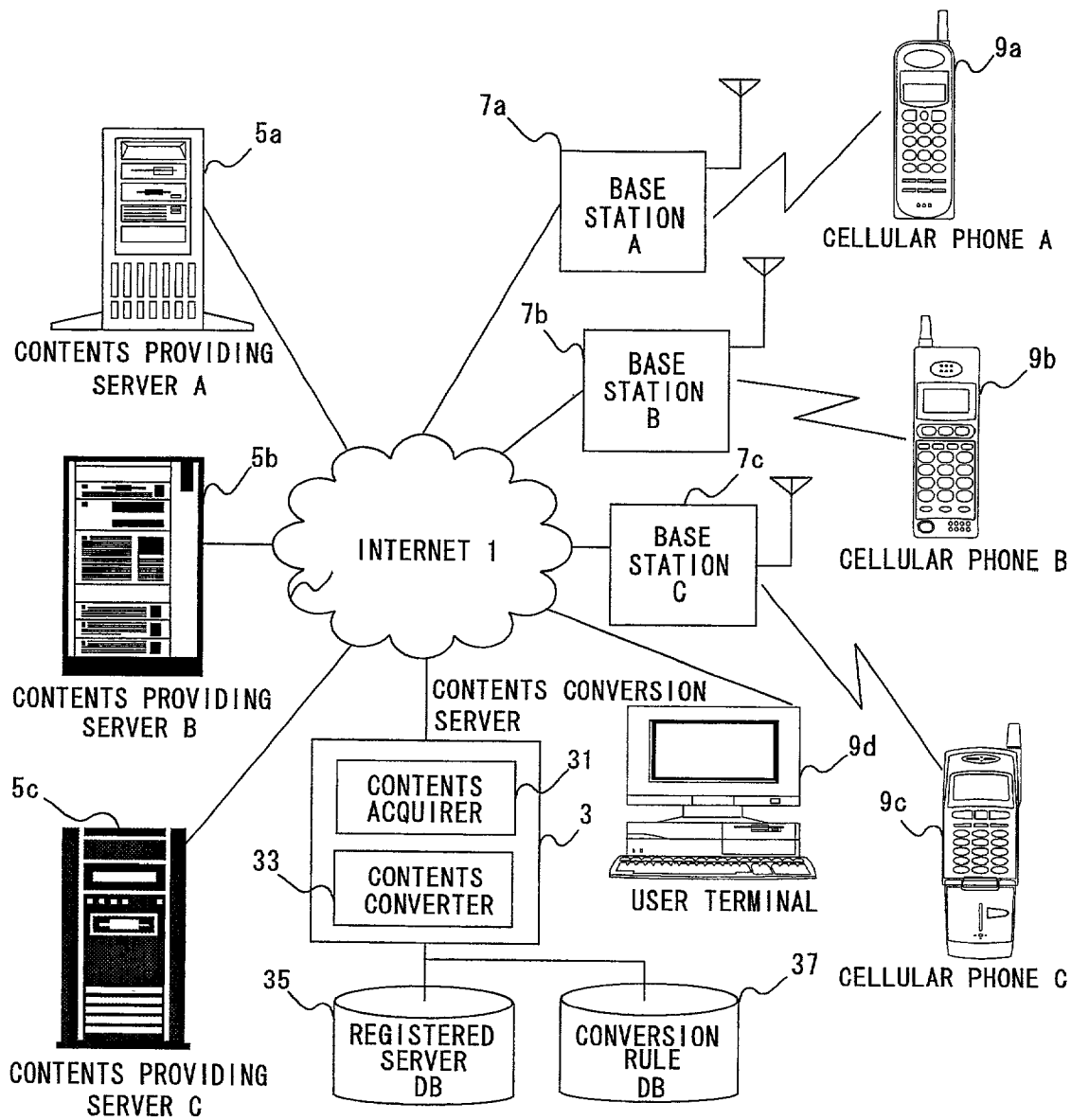
FIG. 1 is a diagram showing a system outline for a preferred embodiment of this invention.

A system outline figure for a preferred embodiment of this invention is shown in FIG. 1. The Internet 1 is connected with a contents providing server A (5a) which has a Web server function to provide contents which are adapted to specifications of a communication career A, a contents providing server B (5b) which has a Web server function to provide contents which are adapted to specifications of a communication career B, a contents providing server C (5c) which has a Web server function to provide contents which are adapted to specifications of a communication career C, a contents conversion server 3 which performs main processings in this preferred embodiment, a base station A (7a) of the communication career A, a base station B (7b) of the communication career B, a base station C (7c) of the communication career C, and, a user terminal 9d which is, for example, a personal computer which has a Web browser function. Though it isn't illustrated, the Internet 1 is connected with many contents providing servers, which provide contents for Web browsers for personal computers. In addition, the user terminal 9d may be not only a personal computer but also another kind of terminal such as a PDA, which has a dedicated browser function.

What communicates with the base station A (7a) of the communication career by radio is a cellular phone A (9a) which has a browser function which is adapted to specifications of the communication career A. What B communicates with the base station B (7b) of the communication career by radio is a cellular phone B (9b) that has a browser function, which is adapted to specifications of the communication career. What communicates with the base station C (7c) of the communication career by radio is a cellular phone C (9c) that has a browser function, which is adapted to specifications of the communication career C.

One of specifications of the communication career A is, for example, to describe contents in Compact HTML. One of specifications of the communication career B is, for example, to describe contents in HDML (Handheld Device Markup Language). One of specifications of the communication career C is, for example, to describe contents in MML (Mobile Markup Language). The contents providing server A (5a) sends the contents information described in Compact HTML to the cellular phone A (9a), in response to a request from the cellular phone A (9a) which has the browser function to display the contents described in Compact HTML. The contents providing server B (5b) sends the contents information described in HDML to the cellular phone B (9b), in response to a request from the cellular phone B (9b) which has the browser function to display the contents described in HDML. The contents providing server C (5c) sends the contents information described in MML to the cellular phone C (9c), in response to a request from the cellular phone C (9c) which has the browser function to display the contents described in MML.

The contents conversion server 3 includes a contents acquirer 31, which acquires the contents information from contents providing servers, in response to requests from cellular phones, and a contents converter 33, which performs a processing to convert the format of contents. According to the type of browser or terminal sent from a requesting source such as a cellular phone, the contents converter 33 performs processings to convert the number of digits of the screen or to divide the contents displayed on originally one screen into several as conversion of contents format. In addition, the contents converter 33 performs processings to convert the link information besides the conversion of the contents format, as described in detail in the following. Furthermore, the contents conversion server 3 manages a registered server DB 35 which stores information of the contents providing server which has registered to the contents conversion server 3 and a conversion rule DB 37 which stores conversion rules used on performing conversion processes in the contents converter 33.

If the cellular phone A (9a) requests contents provided in the contents providing server B (5b), the contents converter 33 performs a processing to convert contents in HDML into contents in Compact HTML. If the cellular phone A (9a) requests contents provided in the contents providing server C (5c), the contents converter 33 performs a processing to convert contents in MML into contents in Compact HTML. If the cellular phone B (9b) requests contents provided in the contents providing server A (5a), the contents converter 33 performs a processing to convert contents in Compact HTML into contents in HDML. If the cellular phone B (9b) requests contents provided in the contents providing server C (5c), the contents converter 33 performs a processing to convert contents in ML into contents in HDML. If the cellular phone C (9c) requests contents provided in the contents providing server A (5a), the contents converter 33 performs a processing to convert contents in Compact HTML into contents in MML. If the cellular phone C (9c) requests contents provided in the contents providing server B (5b), the contents converter 33 performs a processing to convert contents in HDML into contents in MML. Besides this, the contents converter 33 may perform processings to convert contents information described in HTML for personal computers into the contents information in compact HTML, HDML, or MML. Rules for these conversions are stored in the conversion rule DB 37 in every combination of a post-conversion language and an original language. But, since these conversion rules are the same as conventional ones, they aren't explained here any further.

Figure 2:
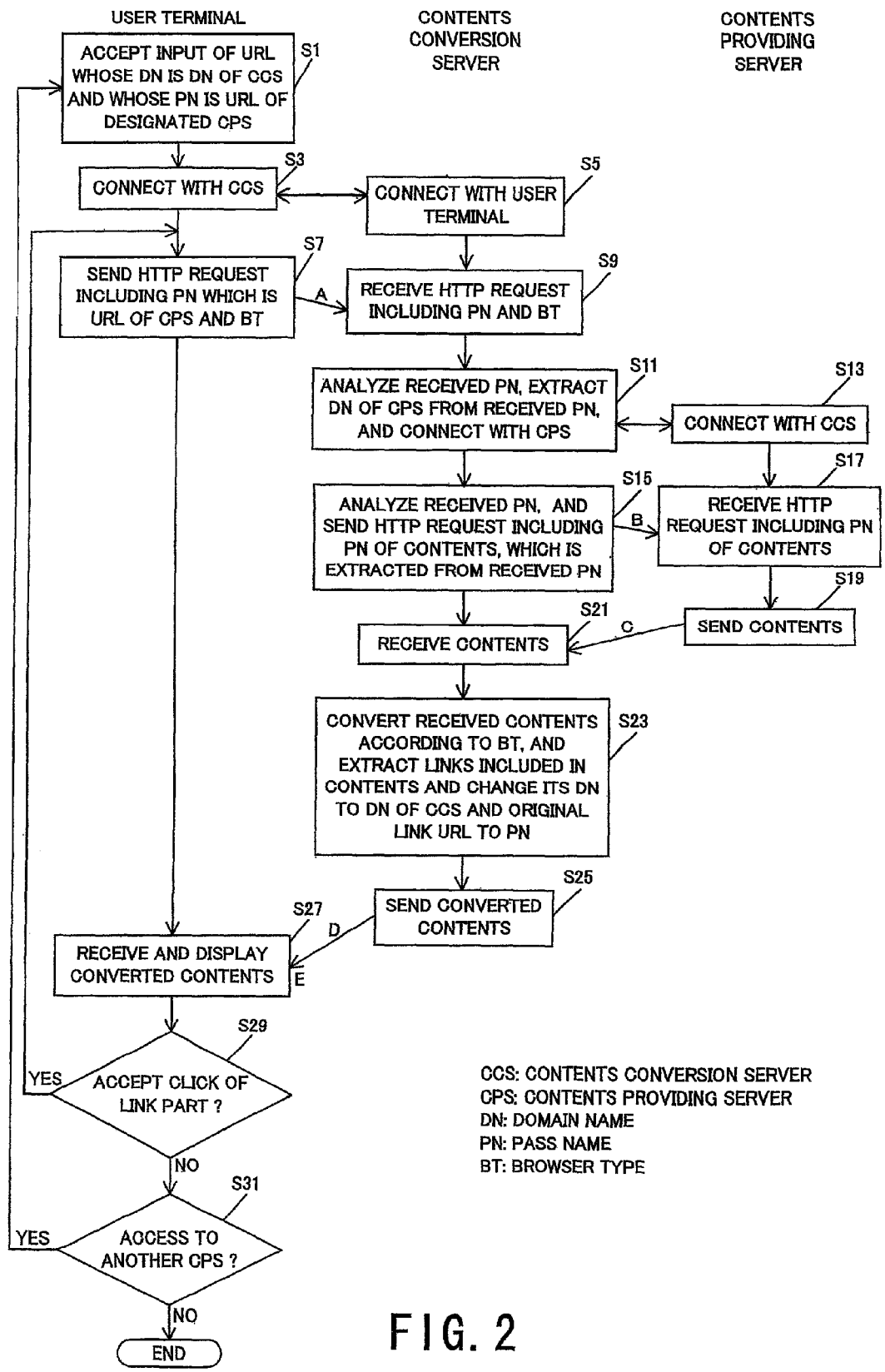
FIG. 2 is a diagram showing a first example of a processing flow in a contents conversion server.
Figure 3:
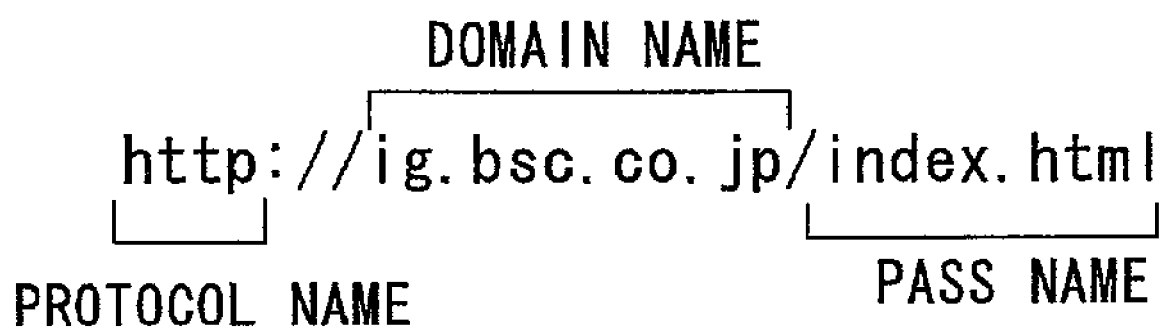
FIG. 3 is a diagram to explain a URL.

Next, the first processing flow of the system shown in the FIG. 1 is explained in FIG. 2 to FIG. 4. Incidentally, here the cellular phone A (9a), the cellular phone B (9b), the cellular phone C (9c), and the user terminal 9d are named generically as user terminals. In addition, processings in user terminals are processings performed by mainly browsers of user terminals. First, a user who operates a user terminal inputs a URL that includes a domain name of the contents conversion server 3 as a domain name and a URL of a contents providing server, which is a primary access destination, as a pass name. FIG. 3 shows a figure for explaining a URL. In this example, "http" represents a protocol name, "ig.bsc-.co.jp", which is hereinafter used as a domain name of the contents conversion server 5, represents a domain name, and "index.html" represents a pass name. Here the pass name includes only a file name, but it may also include a directory name. Namely, the pass name may be described as "IMAGE/index.html". Therefore, if "http://al.co.jp/index.html" is a URL for a contents providing server (e.g. the contents providing server A (5a)), the user inputs "http://ig.bsc.co.jp/al.co.jp/index.html". Incidentally, a protocol name of the contents providing server is omitted. In addition, if the protocol name of the contents providing server is different from the protocol name of the contents conversion server, the protocol name for the contents providing server may be inserted without being omitted. The user terminal accepts the input by the user (Step S1).

The user terminal acquires an IP address of the contents conversion server 3 designated in the domain name of the inputted URL from a DNS (Domain Name System) server (not shown), and connects with the contents conversion server 3 (Step S3). The contents conversion server 3 connects with the user terminal (Step S5). Next, the user terminal sends a GET request via HTTP, which includes the pass name, which is the URL for the contents providing server, and a browser type to the contents conversion server 3 (Step S7).

Figures 4A, 4B, 4C, 4D, 4E:
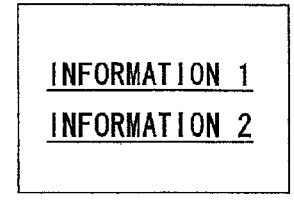
FIG. 4A is a diagram showing an example of data sent in the processing flow of FIG. 2.
FIG. 4B is a diagram showing an example of data sent in the processing flow of FIG. 2.
FIG. 4C is a diagram showing an example of data sent in the processing flow of FIG. 2.
FIG. 4D is a diagram showing an example of data sent in the processing flow of FIG. 2.
FIG. 4E is a diagram showing a display screen example in the processing flow of FIG. 2.
Figure 5:
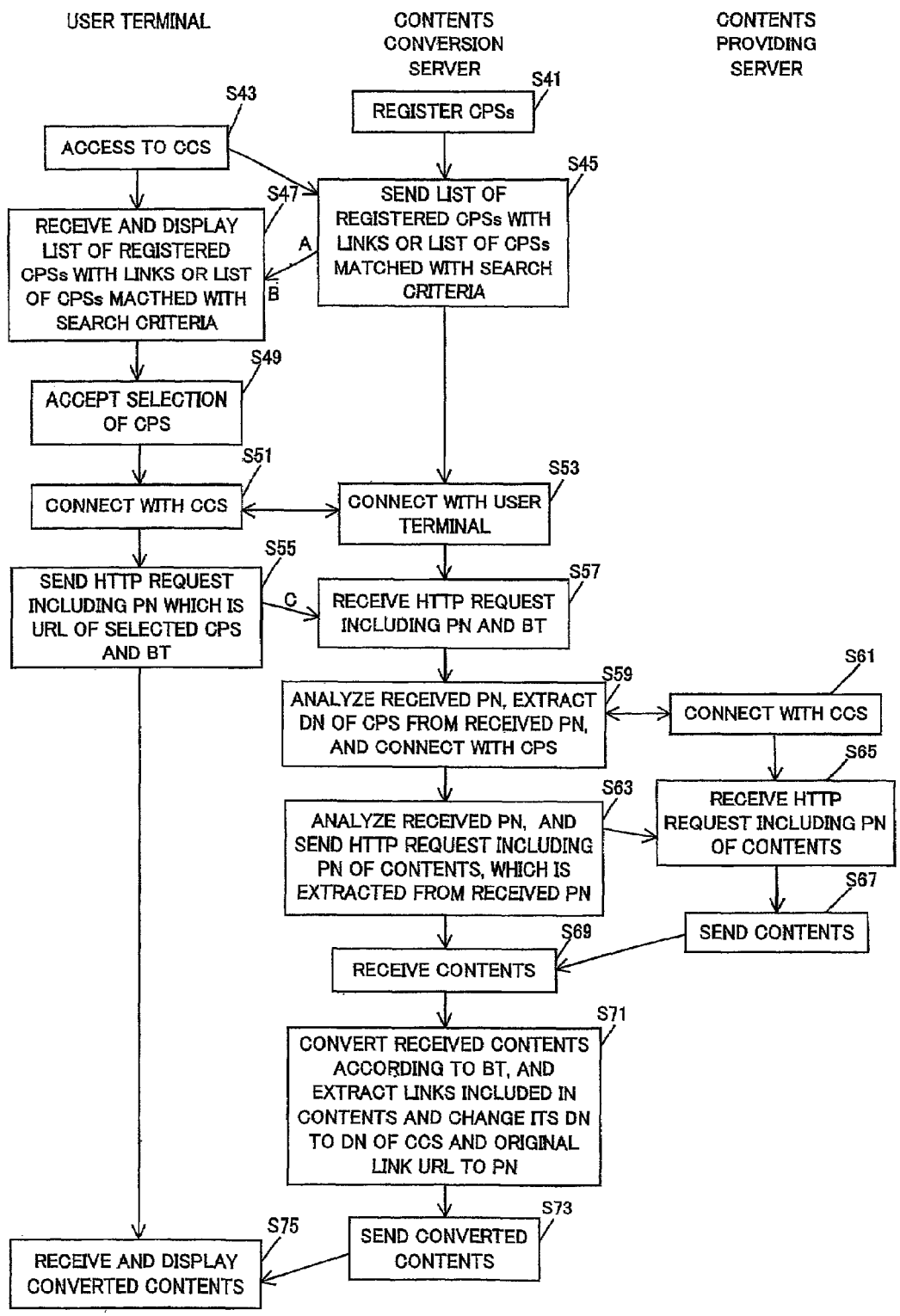
FIG. 5 is a diagram showing a second example of a processing flow in the contents conversion server.

FIG. 4A shows an example of a header of this GET request. As shown in FIG. 4A, the first line of the header contains an indication that this is the GET (request), the pass name (/al.co.jp/index.html), and the version of HTTP (HTTP/1.0). And, in the second and subsequent lines, a header field of "USER-AGENT" is provided, and a name of a program, which issued the GET request, such as a web browser, is put in XXXX of the field. However, the type of the user terminal may be put in this part. Incidentally, a name of a related communication career may be put in the USER-AGENT field. Even in this case, since the type of the browser or the user terminal can be specified from the name of the communication career and so on, the name of the related communication career can be regarded as information concerning the type of the browser or the user terminal.

The contents acquirer 31 in the contents conversion server 3 receives the GET request via HTTP, which includes the pass name and the browser type (Step S9). Then, the contents acquirer 31 analyzes the received pass name, extracts the domain name of the contents providing server included in the pass name, and connects with the contents providing server (Step S11). On this occasion, the contents acquirer 31 acquires the IP address corresponding to the domain name from the DNS server. The contents providing server connects with the contents conversion server 3 (Step S13). Then, the contents acquirer 31 analyzes the received pass name further, and sends a GET request via HTTP, which includes the pass name of the contents information in the contents providing server, to the contents providing server (Step S15). FIG. 4B shows an example of a header of this GET request. The first line of the header contains an indication that this is the GET (request), the pass name (/index.html), and the version of HTTP (HTTP/1.0). In the same way as in FIG. 4A, in the second and subsequent lines, a USER-AGENT field may be provided. But, this field is not important here, so an explanation about this field is omitted.

If the contents providing server receives the GET request via HTTP which includes the pass name of the contents information (Step S17), reads out the contents information (In the example of FIG. 4B, "index.html"), and sends the contents information as a HTTP response to the contents acquirer 31 in the contents conversion server 3 (Step S19). The contents acquirer 31 receives the contents information as the response (Step S21).

It is assumed that a file such as one in FIG. 4C is received. In an example of FIG. 4C, the first line is a HTML start tag and the forth one is a HTML end tag. The "A" start tag of the second line includes "http://a2.co.jp/inf1.html" as a HREF attribute. Words of "information 1" is hyper-linked and is put between "A" start tag and "A" end tag. In the same way, the "A" start tag of the third line includes "http://a3.co.jp/inf2.html" as the HREF attribute. Words of "information 2" is hyper-linked and is put between "A" start tag and "A" end tag.

Next, the contents converter 33 converts the received contents information, in accordance with the browser type included in the GET request, which is received in Step S9. Namely, the contents converter 33 analyzes the format of the received contents information, and specifies an original language (a pre-conversion language). Then, the contents converter 33 judges a post-conversion language, based on the browser type, acquires a conversion rule prescribed in the conversion rule DB 37, based on the combination of the pre-conversion language and the post-conversion language, and converts the contents information, based on the rule. Furthermore, the contents converter 33 judges if the contents information includes link information. Then, if the contents information includes the link information, the contents converter 33 extracts the link information, changes the domain name included in the link information to the domain name (ig.bsc.co.jp) of the contents conversion server 3, and changes an original link destination URL to a pass name (Step S23). And then, the contents converter 33 sends the converted contents information to the user terminal (Step S25).

The converted information sent in Step S25 is contents information such as in FIG. 4D. Compared with FIG. 4C, contents of the HREF attribute included in the "A" start tag of the second line are changed. Namely, the domain name becomes the domain name of the contents conversion server 3 of "ig.bsc.co.jp", and the original URL is set as the pass name. In other words, it becomes "http://ig.bsc.co.jp/a2.co.jp/inf1.html". Also contents of the HREF attribute included in "A" start tag of the third line are changed in the same way. Namely, it becomes "http://ig.bsc.co.jp/a3.co.jp/inf2.html".

The user terminal receives the converted contents information from the contents conversion server 3, and displays it on the display device (Step S27). If the user terminal receives converted contents information such as shown in FIG. 4D, the display device displays such as shown in FIG. 4E. Incidentally, if the user terminal receives original contents information also such as shown in FIG. 4C, the display device also displays such as shown in FIG. 4E. However, the link destination is different in the case of FIG. 4E from the case of FIG. 4C.

If the user looks at this display and clicks a hyper text (a link part), the user terminal accepts the click (Step S29: Yes route), and the processing returns to Step S7. If the user clicks the part of "information 2", for example, the user terminal sends a GET request which includes the browser type and "a2.co.jp/inf1.html" as a pass name to the contents conversion server 3. Hereafter, processings are as described above.

On the other hand, in the case that the user doesn't click the hyper text (Step S29: No route), if the user terminal accesses to another contents providing server (Step S31: Yes route), the processing returns to Step 1. Meanwhile, if it is not an access to another contents providing server, the processing ends.

With such processings, whichever type of the user terminal is, or contents in whichever markup language which contents providing servers provide, since the contents conversion server 3 converts the contents information appropriately and provides the user with the converted contents information, the type of the contents providing server which is available for the user increases, and the contents providing server can increase its users only by preparing the contents of one type.

Next, a case that the contents providing server registers itself to the contents conversion server 3 is explained. In the processing flow of FIG. 2, the user must input the URL that includes the domain name of the contents conversion server 3 as the domain name and the URL of contents information as the pass name, first by himself or herself. Here, a manager or an administrator of the contents conversion server 3 voluntarily, the manager or the administrator of the contents conversion server 3, who accepts requests from the contents providing servers, or a processor inside the contents conversion server 3, which receives and registers registration requests by managers or administrators of the contents providing servers, registers information such as URLs of the contents providing servers to the registered server DB 35 of the contents conversion server 3 (Step S41). In the case of the registration request by managers or administrators of the contents providing servers, a registration fee may be collected. A data includes the URL of the contents providing server and information concerning the manager or the administrator.

Next, the user operates the user terminal and makes the user terminal access to the contents conversion server 3 (Step S43). In response to this access, the contents conversion server 3 searches the registered server DB 35, and extracts information concerning the URLs of the registered contents providing servers and so on. Then, the contents conversion server 3 generates URLs that include the domain name of the contents conversion server 3 as a domain name and a URL of the registered contents providing server as a pass name, uses the URLs as link destination information, and constructs Web page data. This Web page data is, for example, a list of the registered contents providing server and is in the format of hyper text. The contents conversion server 3 sends this Web page data to the user terminal (Step S45).

The contents conversion server 3 may includes a search engine for the registered contents providing servers. In this case, when the user inputs a search condition and makes the user terminal send the condition to the contents conversion server 3, the search engine in the contents conversion server 3 receives the condition and searches the registered server DB 35 for servers, which match with the search condition. By using the search result, the contents conversion server 3 generates web page data, which includes a list of matched servers, and sends it to the user terminal.

Figures 6A, 6B, 6C:
FIG. 6A is a diagram showing an example of data sent in the processing flow of FIG. 5.
FIG. 6B is a diagram showing a display screen example in the processing flow of FIG. 5.
FIG. 6C is a diagram showing an example of data sent in the processing flow of FIG. 5.

FIG. 6A shows an example of the Web page data. Here, an example that only one server is registered is shown. "A1 service", which is a service name of a registered contents providing server, is put between "A" start tag and "A" end tag. Though an original link destination is "http://a1.co.jp/inf1.html", a HREF attribute included in "A" start tag becomes "http://ig.bsc.co.jp/a1.co.jp/inf1.html" because "ig.bsc.co.jp", which is the domain name of the contents conversion server 3, is inserted as the domain name.

The user terminal receives the Web page data, which is the list of the registered contents providing servers, from the contents conversion server 3, and displays it on the display device (Step S47). If a Web page data, such as shown in FIG. 6A, is used, a screen shown in FIG. 6B is displayed. The user looks at such displayed contents, selects and clicks a contents providing server. The user terminal accepts the selection of the contents providing server (Step S49), and acquires the URL of the link destination. Then, the user terminal connects with the contents conversion server 3 designated as the domain name in the URL of the link destination (Step S51). On this occasion, the user terminal acquires an IP address corresponding to the domain name from the DNS server. On the other hand, the contents conversion server 3 connects with the user terminal (step S53). Then, the user terminal sends a GET request via HTTP, which includes the pass name of the URL of the link destination, which is the URL for the selected contents providing server, and a browser type to the contents conversion server 3 (Step S55).

FIG. 6C shows an example of a header of GET request sent on this occasion. In the example of FIG. 6C, the first line of the header contains "GET" which indicates a GET request, the URL of the contents providing server (a1.co.jp/inf1.html) which is the pass name included in the URL of the link destination, and the version of HTTP (HTTP/1.0). And, in the second and subsequent lines, a header field of "USER-AGENT" including the browser type is provided. This part is the same as explained in FIG. 4A.

The contents acquirer 31 in the contents conversion server 3 receives the GET request via HTTP, which includes the pass name and the browser type from the user terminal (Step S57). Then, the contents acquirer 31 analyzes the received pass name, extracts the domain name of the contents providing server included in the pass name, and connects with the contents providing server (Step S59). On this occasion, the contents acquirer 31 acquires the IP address corresponding to the domain name from the DNS server. The contents providing server connects with the contents conversion server 3 (Step S61). Then, the contents acquirer 31 analyzes the received pass name further, and sends a GET request via HTTP, which includes the pass name of the contents information in the contents providing server, to the contents providing server (Step S63). In an example of FIG. 6C, a pass name of "/inf1.html" is sent.

If the contents providing server receives the GET request via HTTP which includes the pass name of the contents information (Step S65), the contents providing server reads out the contents information (in the example of FIG. 6C, "inf1.html"), and sends it back as a response via HTTP (step S67). The contents acquirer 31 receives the contents information as the response via HTTP (Step S69).

Next, the contents converter 33 converts the received contents information, in accordance with the browser type, which is included in the GET request received in Step S57. Namely, the contents converter 33 analyzes the format of the received contents information, and specifies an original language (a pre-conversion language). Incidentally, the original language may be specified by the type of the contents providing server or by the URL. Then, the contents converter 33 judges a post-conversion language, based on the browser type, acquires a conversion rule prescribed in the conversion rule DB 37, based on the combination of the pre-conversion language and the post-conversion language, and converts the contents information, based on the rule. Furthermore, the contents converter 33 judges if the contents information includes link information. Then, if the contents information includes the link information, the contents converter 33 extracts the link information, changes the domain name included in the link information to the domain name (ig.bsc.co.jp) of the contents conversion server 3, and changes an original link destination URL to a pass name (Step S71). Then, the contents converter 33 sends the converted contents information to the user terminal (Step S73). The user terminal receives the converted contents information from the contents conversion server 3, and displays it on the display device (Step S75).

By repeating such processings, the user terminal can acquire contents information by the registered contents providing servers, regardless of the type of the user terminal or the browser type. And, also managers or administrators of contents providing servers don't need to prepare contents information in accordance with various types of user terminals or the browser type voluntarily, and moreover, they don't need to prepare contents conversion programs and so on voluntarily but only to register their contents providing servers to the contents conversion server 3. Consequently, managers or administrators can increase their users without heavy burdens.

Though a preferred embodiment of this invention was explained above, this invention isn't limited to this. For example, as for the type of markup language, HTML, compact HTML, HDML, and MML are shown. But, the type of markup language isn't limited to these ones, and this invention can handle other markup languages too.

Furthermore, HTTP GET requests in FIG. 4A, FIG. 4B and FIG. 6C are described based on HTTP version 1.0, but if the version of HTTP is different from version 1.0, a different description may be necessary.

Moreover, in FIG. 1, the functional blocks in the contents conversion server 3 are provided only to explain this preferred embodiment, and therefore, those maybe different from components for an actual program. The management structure of database is the same. Furthermore, the contents conversion server or contents providing servers may be composed of not one computer but of several computers. If this invention is realized as an actual business, for example, the contents conversion server 3 may be provided in application service provider (ASP) and so on. ASP obtains profits by accounting per packet unit, accounting per page, accounting per usage time, and so on from users who browsed information via the contents conversion server 3 or communication careers whom these users use, and so on.

As described above, this invention can provide a technique enabling several kinds of contents information to be used, regardless of the type of terminal without making a burden to contents providers.

Although the present invention has been described with respect to a specific preferred embodiment thereof, various change and modifications maybe suggested to one skilled in the art, and it is intended that the present invention encompass such changes and modifications as fall within the scope of the appended claims.

What is claimed is:

1. A contents conversion method in a contents conversion server, which is connected to a plurality of user terminals and a plurality of contents providing servers through a network, comprising:
   receiving, from a certain user terminal of said plurality of user terminals, access destination information and information concerning a type of said certain user terminal or an access requesting source in said certain user terminal;
   if said access destination information is interpreted to represent only said contents conversion server as an access destination, transmitting, to said certain user terminal, information including link information causing access via said contents conversion server to a contents providing server registered in said contents conversion server in advance; and
   if said access destination information is interpreted to represent contents information in one of said plurality of said contents providing servers as an access destination, performing a conversion processing, and
   wherein performing said conversion processing comprises:
      acquiring contents information represented in said access destination information from said one of plurality of said contents providing servers;
      by converting said contents information of an arbitrary format, based on said information concerning said type of said certain user terminal or said access requesting source in said certain user terminal, and by further converting link information included in said contents information in accordance with a predetermined rule to convert an original link destination into a format in which said contents conversion server is set as an access destination and information concerning said original link destination is included, generating converted contents information; and
      transmitting the converted contents information to said certain user terminal.

2. The contents conversion method as set forth in claim 1, further comprising:
   if said access destination information is interpreted to represent only said contents conversion server as an access destination and a search condition for the registered contents providing servers is received, searching said registered contents providing servers matching with said search condition and transmitting, to said certain user terminal, information including link information causing access via said contents conversion server to said registered contents providing servers matching with said search condition.

3. A program embodied on a computer-readable medium causing a contents conversion server, which is connected to a plurality of user terminals and a plurality of contents providing servers through a network, to convert contents, said program comprising:
   receiving from a certain user terminal of said plurality of user terminals, access destination information and information concerning a type of said certain user terminal or an access requesting source in said certain user terminal;
   if said access destination information is interpreted to represent only said contents conversion server as an access destination, transmitting, to said certain user terminal, information including link information causing access via said contents conversion server to a contents providing server registered in said contents conversion server in advance; and if said access destination information is interpreted to represent contents information in one of said plurality of said contents providing servers as an access destination, performing a conversion processing, and wherein said performing said conversion processing comprises:

acquiring contents information represented in said access destination information from said one of the plurality of said contents providing servers;

by converting said contents information of an arbitrary format, based on said information concerning said type of said certain user terminal or said access requesting source in said certain user terminal, and by further converting link information included in said contents information in accordance with a predetermined rule to convert an original link destination into a format in which said contents conversion server is set as an access destination and information concerning said original link destination is included, generating converted contents information; and transmitting the converted contents information to said certain user terminal.

4. The program as set forth in claim 3, further comprising:

if said access destination information is interpreted to represent only said contents conversion server as an access destination and a search condition for the registered contents providing servers is received, searching said registered contents providing servers matching with said search condition, and transmitting, to said certain user terminal, information including link information causing access via said contents conversion server to said registered contents providing servers matching with said search condition.

5. A contents conversion server, which communicates with a plurality of user terminals and a plurality of contents providing servers through a network, comprising:

a unit that receives from a certain user terminal of said plurality of user terminals, access destination information and information concerning a type of said certain user terminal or an access requesting source in said certain user terminal, the unit responsive to access destination information interpreted to represent only said contents conversion server as an access destination, transmitting, to said certain user terminal, information including link information causing access via said contents conversion server to a contents providing server registered in said contents conversion server in advance;

a unit that acquires contents information represented in said access destination information from one of said plurality of said contents providing servers as an access destination, if said access destination information is interpreted to represent contents information in said one of the plurality of said contents providing servers;

a converter that converts said contents information of an arbitrary format, based on said information concerning said type of said certain user terminal or said access requesting source in said certain user terminal, and further converting link information included in said contents information in accordance with a predetermined rule to convert an original link destination into a format in which said contents conversion server is set as an access destination and information concerning said original link destination is included, to generate converted contents information; and a unit that transmits the converted contents information to said certain user terminal.

6. The contents conversion server as set forth in claim 5, further comprising:

a unit that searches registered contents providing servers matching with a search condition if said access destination information is interpreted to represent only said contents conversion server as an access destination and said search condition for the registered contents providing servers is received; and a unit that transmits information including link information causing access via said contents conversion server to said registered contents providing servers matching with said search condition.

* * * * *